Sept. 27, 1938.   W. J. CLEMENTS   2,131,165
ELECTRIC CONNECTION
Filed Nov. 10, 1937
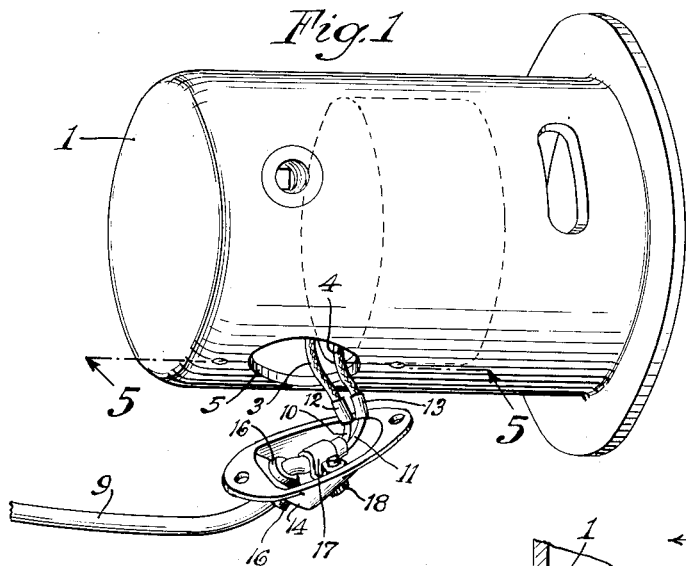
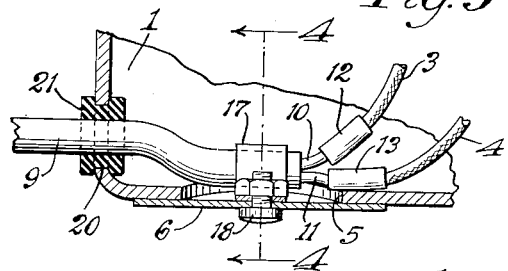
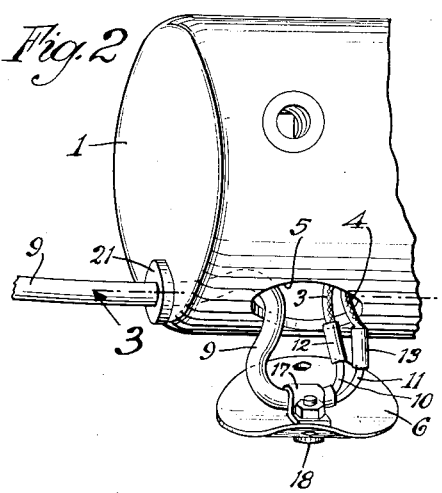
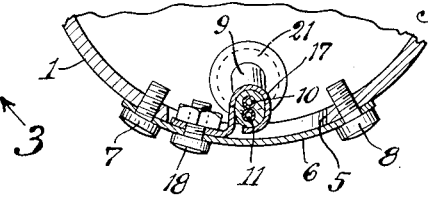
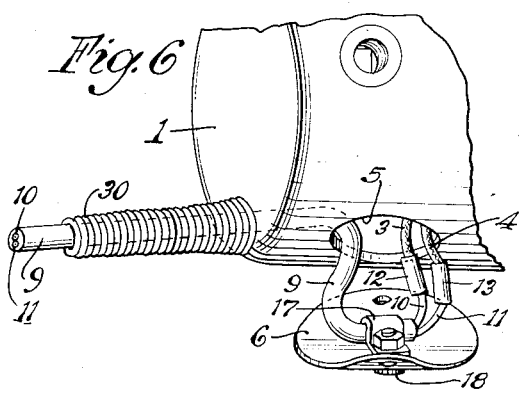
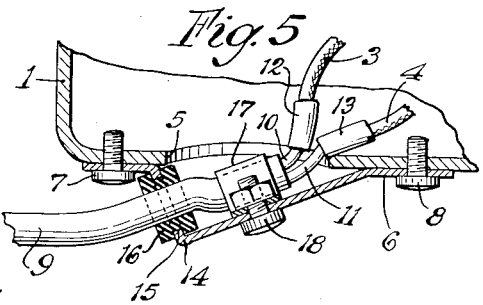
Inventor
William J. Clements
by Parker Painter
Attorneys Patented Sept. 27, 1938

2,131,165

UNITED STATES PATENT OFFICE 2,131,165

ELECTRIC CONNECTION

William J. Clements, Chicago, Ill., assignor to Clements Manufacturing Company, Chicago, Ill., a corporation of Illinois Application November 10, 1937, Serial No. 173,743

2 Claims. (Cl. 247—9)

My invention relates to an improvement in electric connection means. One purpose is the provision of a connection for use with housings, partitions or the like whereby a connecting closure plate or member can be partially released from the housing or partition with which it is associated so that a conductive connection associated with the releasable plate or member can be worked upon exteriorly, as where it is necessary to splice leads.

One application of my invention is to a connection plate for employment with motor housings such as are employed for vacuum cleaners and the like. It will be understood, however, that it may be applied to any situation where a housing or a partition normally bars ready access of the operator to interior conductive connections of the type which have to be spliced.

Other objects will appear from time to time in the course of the specification and claims.

I illustrate my invention more or less diagrammatically in the accompanying drawing wherein:

Figure 1 is an exterior view of a motor housing with the connection plate released;

Figure 2 is a partial similar view of a variant form of my device;

Figure 3 is an enlarged section on the line 3—3 of Figure 2;

Figure 4 is a section on line 4—4 of Figure 3;

Figure 5 is a view on the line 5—5 of Figure 1, illustrating the parts in the position which they take when the connection plate is in the closed position; and Figure 6 is a perspective view of a further variation.

Like parts are indicated by like symbols throughout the specification and drawing.

Referring to the drawing, 1 generally indicates a housing or partition member which may enclose a motor diagrammatically indicated at 2. 3, 4 indicate leads extending from the motor. The housing 1 is apertured as at 5 and 6 is a closure plate which may be secured in position in relation to the aperture as by thumb screws 7, 8 or any other suitable securing means. 9 is a conductor extending from any suitable power source, for example a commercial source of electric power. It includes two wires or conductors 10, 11 which may be spliced to the leads 3, 4 as at 12, 13.

It will be observed that the length of the leads 3, 4 is such that when the plate 6 is released from the housing 1, as by removal of the thumb screws 7, 8, the leads then are able to extend exteriorly of the housing 1 and outwardly through the aperture 5 in such fashion that the operator has easy access to the splices 12, 13 so that they can readily be initially made or can be changed when necessary, as where a new wire or conductor 9, 10, 11 has to be applied. In the form shown in Figures 1 and 5, the plate 6 is shown as having an outward extension or angle 14 apertured as at 15 which receives the rubber gromet 16 through which the cable 9 passes. 17 is any suitable clamp for holding the cable to the inner face of the plate 6. It may be controlled for example by the screw 18.

In the form of Figures 1 and 4, the cable 9 is entirely exterior to the housing and does not penetrate the aperture 5 at all. In the form of Figures 2, 3, 4 and 6, however, I illustrate the cable 9 as passing through an aperture 20 in the housing at a point removed from the aperture 5, this aperture 20 being also provided if desired with a rubber gromet 21. The cable is preferably not tightly gripped by the gromet 21 so that when the plate 6 is released from the housing 1 and is drawn into the position in which it is shown for example in Figure 2, the cable 9 extends a sufficient distance to permit the plate to be removed sufficiently outwardly to render work on the splices 12 and 13 easy. If for any reason the cable 9 is fixed in relation to the gromet 21 or the housing 1, then preferably I employ a sufficient length of the cable 9 within the housing so that the plate 6 may be withdrawn a convenient distance when released.

As shown in Figure 6 I may also employ a yielding collapsible member 30, for example a wire spring, interposed between the outer face of the housing 1 and the cable 9. This may serve as means for preventing breakage of the cable 9, although in the structure herein shown breakage is exceedingly unlikely.

It will be realized that whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

It will be further realized that whereas I have indicated my device in connection with a closed housing it may be employed with partitions or enclosures of a multiplicity of sizes and shapes.

I claim:

1. In combination, a motor housing for vacuum cleaners and the like, a motor in said housing, said housing having an aperture in its wall, a closure for said aperture, means for removably securing said closure in relation to said aperture, a plurality of leads extending from said motor toward said aperture, said leads being of sufficient length to extend outwardly through said aperture a substantial distance, a cord for said motor housing, adapted to extend to any suitable source of commercial electric power, said cord including a plurality of conductors, means for removably securing the conductors of the cord to the leads of the motor, and a readily removable connection between said closure and said cord and leads, adapted to secure said cord and leads to the inner face of said closure, said connection and the connections between the conductors of the cords and the motor leads being substantially exterior to said housing when the closure is removed from the housing, and being thereby positioned for ready access by the operator.

2. In combination, a motor housing for vacuum cleaners and the like, a motor in said housing, said housing having an aperture in its wall, a closure for said aperture, means for removably securing said closure in relation to said aperture, a plurality of leads extending from said motor toward said aperture, said leads being of sufficient length to extend outwardly through said aperture a substantial distance, a cord for said motor housing, adapted to extend to any suitable source of commercial electric power, said cord including a plurality of conductors, means for removably securing the conductors of the cord to the leads of the motor, and a readily removable connection between said closure and said cord and leads, adapted to secure said cord and leads to the inner face of said closure, said connection and the connections between the conductors of the cords and the motor leads being substantially exterior to said housing when the closure is removed from the housing, and being thereby positioned for ready access by the operator.

WILLIAM J. CLEMENTS.